(12) United States Patent
Ilcisin et al.

(10) Patent No.: US 6,172,660 B1
(45) Date of Patent: Jan. 9, 2001

(54) PALC DISPLAY PANEL WITH SPACERS BETWEEN THE CHANNEL MEMBER AND THE COVER SHEET

(75) Inventors: Kevin J. Ilcisin, Beaverton; Paul C. Martin, Sunriver, both of OR (US)

(73) Assignee: Tektronix, Inc., Beaverton, OR (US)

( * ) Notice: Under 35 U.S.C. 154(b), the term of this patent shall be extended for 0 days.

(21) Appl. No.: 09/153,578

(22) Filed: Sep. 15, 1998

Related U.S. Application Data

(60) Provisional application No. 60/059,962, filed on Sep. 25, 1997.

(51) Int. Cl.[7] .................................................. G02F 1/33
(52) U.S. Cl. ................. 345/87; 313/582; 349/32
(58) Field of Search .......................... 345/87, 60; 349/32; 315/169.4; 313/582, 584

(56) References Cited

U.S. PATENT DOCUMENTS 5,754,003 * 5/1998 Murai et al. ........................ 313/582
6,094,183 * 7/2000 Tanamachi et al. ................ 345/60

* cited by examiner

Primary Examiner—Steven J. Saras
Assistant Examiner—William C. Spencer
(74) Attorney, Agent, or Firm—John D. Winkelman; John Smith-Hill

(57) ABSTRACT

The cover sheet of a PALC display panel is spaced from the ribs of the channel member.

1 Claim, 2 Drawing Sheets

PALC DISPLAY PANEL WITH SPACERS BETWEEN THE CHANNEL MEMBER AND THE COVER SHEET

CROSS REFERENCED TO RELATED APPLICATIONS

This application claims the benefit of U.S. Provisional Application No. 60/059,962, filed Sep. 25, 1997.

BACKGROUND OF THE INVENTION

This invention relates to a PALC panel with spacers between the channel member and the cover sheet.

U.S. Pat. No. 5,077,553 discloses apparatus for addressing data storage elements. A practical implementation of the apparatus shown in U.S. Pat. No. 5,077,553 is illustrated schematically in FIG. 3 of the accompanying drawings.

The display panel shown in FIG. 3 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 3), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The panel elements may include additional layers for improving viewing angle. The region of the upper surface of the display panel that bounds the panel element constitutes a single pixel 30 of the display panel. When the anode 24 in one of the channels is connected to ground and a suitable negative voltage is applied to the cathode 26 in that channel, the gas in the channel forms a plasma which provides a conductive path to ground at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper-polarizer 16 is a linear polarizer having its plane of polarization at 90°, and that the electro-optic material is a twisted nematic liquid crystal material which rotates the plane of polarization of linearly polarized light passing therethrough by an angle which is a function of the electric field in the liquid crystal material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity which depends on the electric field, allowing a gray scale to be displayed.

Two important visual characteristics of a PALC display panel are the resolution of the display and the contrast ratio of the display. The resolution of the display is a measure of its ability to show fine detail. The resolution of the display can be increased by reducing the spatial period P of the channels.

The contrast ratio of the display is the ratio of the intensity of light passed by the channel in the off state to the intensity of light passed by the channel in the on state, and it is also desirable that the contrast ratio be maximized. One way of increasing the contrast ratio is to increase the aperture ratio of the channels, i.e. the ratio of the width W of the base of a channel to the spatial period P of the channels.

The placement of the electrodes also has a bearing on the operation of the display panel. In particular, it is desirable that the distance of the electrodes from the bottom of the channel should be maximized in order to improve plasma generation and thereby provide superior addressability. Further, it is desirable that the distance of the electrodes from the top of the channel also be maximized in order to avoid a DC offset effect (non-uniformity in distribution of charge over the lower surface of the cover sheet) which reduces display brightness and contrast ratio and causes a temporal flicker of the display. These two factors imply that the height of the ribs should be maximized, and they may be balanced by placing the electrodes halfway up the ribs.

Process limitations in manufacture of the channel member are such that the width R of a rib between the flat bottoms of two adjacent channels may depend on the height of the rib.

It will therefore be seen that increasing the height of the ribs in order to optimize the placement of the electrodes may conflict with optimization of the visual characteristics of the panel.

SUMMARY OF THE INVENTION

Hitherto, it has been considered necessary for the cover sheet to fit snugly against the ribs to inhibit diffusion of charged particles from channel to channel. However, it has been discovered in accordance with the invention that the quality of the display is not degraded if the cover sheet is spaced away from the ribs.

In accordance with the present invention there is provided an improved PALC panel comprising a channel member having channels at a first main surface thereof, adjacent channels being separated by ribs, and a cover sheet sealed to the channel member about a boundary of the channel member and having a first main surface in confronting relationship with the channel member and also having a second main surface, wherein the improvement resides in that the cover sheet is spaced from the ribs of the channel member.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals indicate corresponding elements.

DETAILED DESCRIPTION

Figure 1:
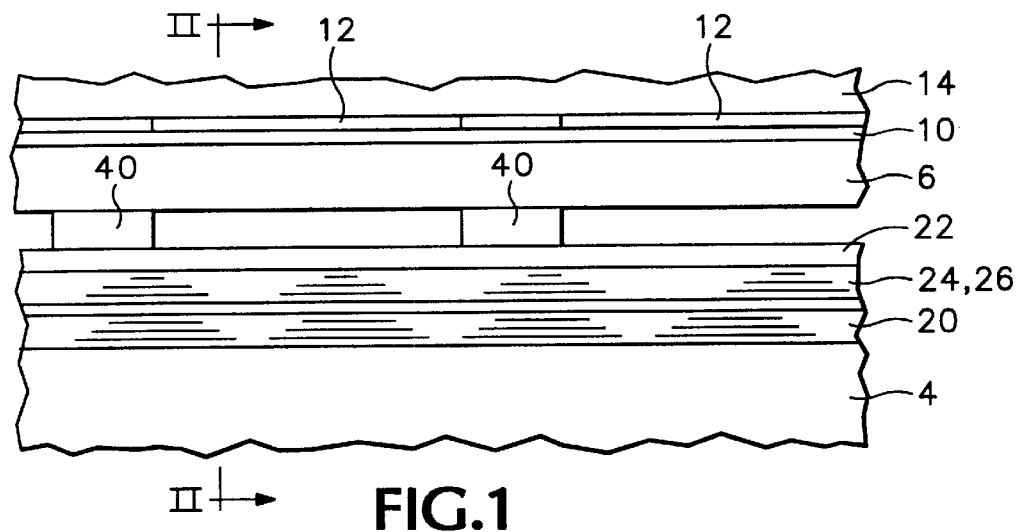
FIG. 1 is a partial sectional view of a PALC display panel according to the present invention.
Figure 2:
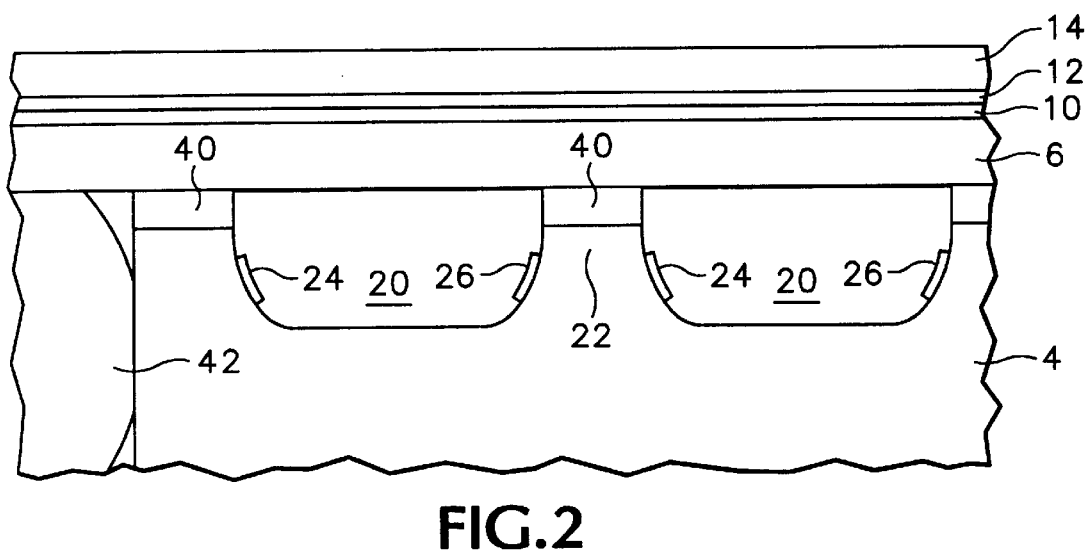
FIG. 2 is a partial sectional view of the PALC display panel shown in FIG. 1, taken on the line II—II of FIG. 1.

Referring to FIG. 1, spacers 40 are interposed between the ribs 22 and the cover sheet 6. The spacers are preferably discrete spacer elements spaced apart along the ribs.

Figure 3:
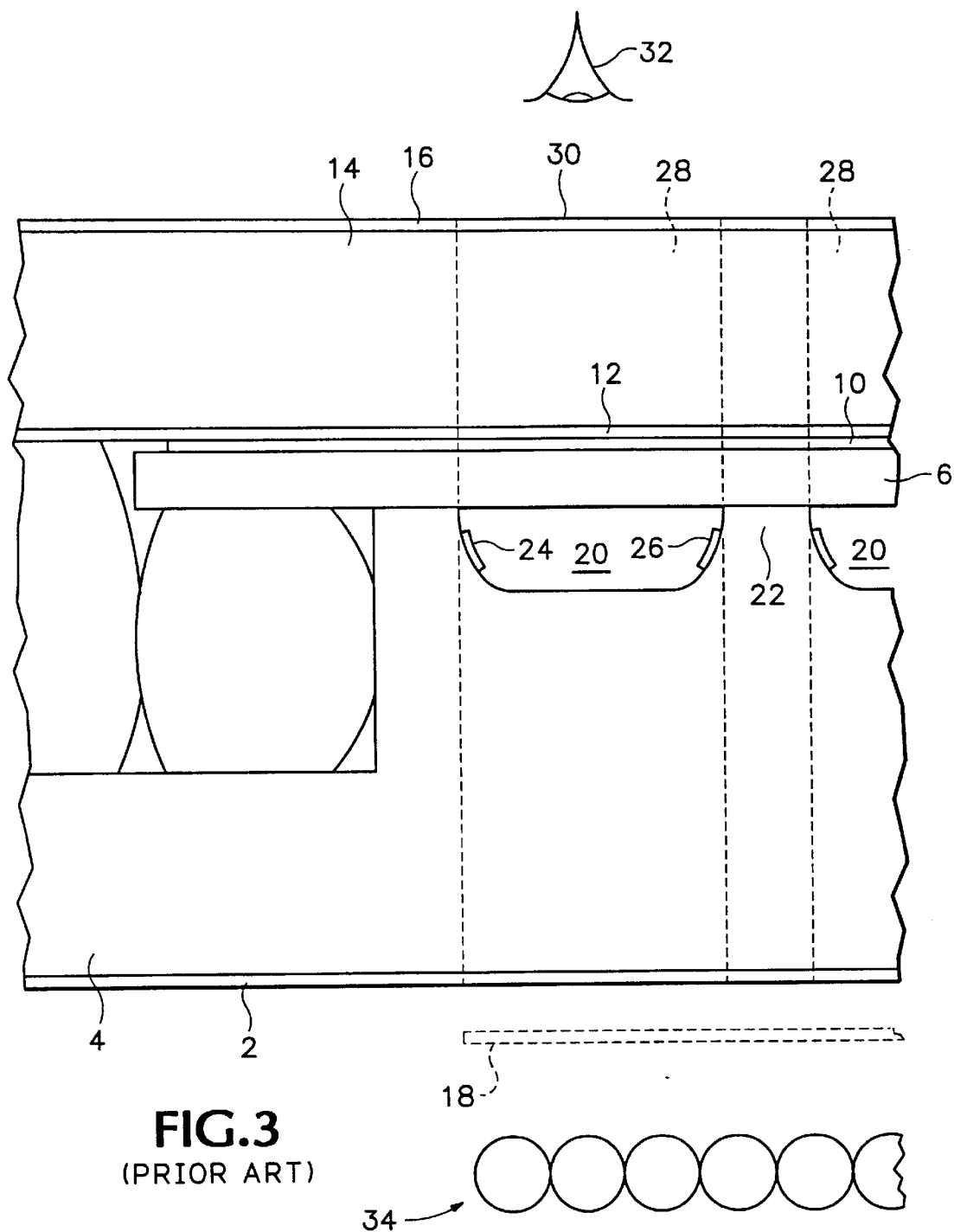
FIG. 3 is a partial sectional view of a PALC display panel in accordance with the prior art.

The cover sheet 6 is sealed to the channel member 4 about its periphery by a bead 42 of adhesive similar to the bead shown in FIG. 3 but the size of the bead 42 takes account of the space between the channel member 4 and the cover sheet due to the spacers 40. Although the pressure in the channels is subatmospheric, capillary forces in the liquid crystal layer 10 prevent the cover sheet from bowing toward the channel member between the spacer elements.

Use of the spacers allows effective height of the ribs 22 to be increased, increasing the distance between the flat bottom of the channels and the cover sheet, without increasing the actual height of the ribs and correspondingly increasing the width of the ribs. Accordingly, for a given height of the ribs 22, the electrodes 24 and 26 can be spaced farther both from the cover sheet and from the base of the channels than in the case of the structure shown in FIG. 3. Since diffusion of charged particles between the channels does not significantly exacerbate DC offset, the electrical characteristics of the panel are improved without degrading the display.

It will be appreciated that the invention is not restricted to the particular embodiment that has been described, and that variations may be made therein without departing from the scope of the invention as defined in the appended claims and equivalents thereof.

What is claimed is:

1. An improved PALC panel comprising a channel member having channels at a first main surface thereof, adjacent channels being separated by ribs, and a cover sheet sealed to the channel member about a boundary of the channel member and having a first main surface in confronting relationship with the channel member and also having a second main surface, wherein the improvement resides in that the cover sheet is held in spaced relationship relative to the ribs by spacer members interposed between the ribs and the cover sheet, the spacer members comprising discrete spacer elements spaced along the ribs.

* * * * *